Jan. 22, 1952

E. L. CLARK 2,583,323

VERTICAL LINEARITY IN TELEVISION RECEIVER

Filed March 29, 1949

Inventor:
Edwin L. Clark
By [signature]
Attorney

Patented Jan. 22, 1952 2,583,323

UNITED STATES PATENT OFFICE 2,583,323

VERTICAL LINEARITY IN TELEVISION RECEIVERS

Edwin L. Clark, Collingswood, N. J., assignor to Radio Corporation of America, a corporation of Delaware Application March 29, 1949, Serial No. 84,024

5 Claims. (Cl. 320—1)

This invention relates to signal generators and more particularly to methods and sawtooth wave generators.

It is well known that when a constant direct voltage is suddenly applied to a condenser and resistor in series, the transient voltage across the condenser increases at an exponential rate and that it is sufficiently linear during the first part of the charging cycle to be useful in sweep circuits used in conjunction with cathode ray tubes. In such circuits, therefore, the direct voltage required must be of the order of four times the maximum voltage attained by the condenser. This obviously results in inefficient operation. The efficiency of generators such as deflection generators in television systems is, of course, quite important.

According to this invention, the voltage across the charging condenser of a saw tooth increases at a linear rate approaching the direct voltage applied. This is accomplished by distorting the exponential voltage wave across the condenser and feeding the distorted wave into series with the steady direct voltage applied to the condenser in such manner that the resultant voltage applied across the condenser is lower at the beginning of the charging cycle than at the end. In other words, the difference between the voltage applied to the condenser and the condenser voltage that opposes it is substantially constant throughout the charging cycle. It will therefore be seen that the magnitude of the supply voltage required is less than that used in the standard sweep circuits for a given linear change in voltage across the condenser.

Accordingly, it is an object of this invention to provide a means for linearly charging a condenser.

It is a further object of this invention to provide a means whereby a condenser may be charged at a linear rate to a voltage approaching the charging voltage.

Another object of this invention is to provide a circuit for generating a linear sweep voltage wave with a minimum of direct current potential.

A still further object of this invention is to increase the linearity of the output of a sweep generator with the addition of a minimum number of component parts.

These and other objects will become apparent from a detailed consideration of the drawing in which.

Since the rate at which a condenser charges is determined by the resistance in series with it and the resultant voltage applied, it ordinarily charges at an exponential rate, but if the applied voltage is maintained at a constant value, the rate of charge is determined solely by the value of the series resistor. According to this invention, therefore, there is not only applied a steady value of direct current potential to the resistor and condenser in series, but there is also inserted in series with the condenser a source of direct potential the value of which is varied during the charging cycle so as to maintain the resultant voltage applied to the condenser at a constant level. This controlled potential opposes the steady direct potential at all times but is reduced as the condenser charges so that the charging potential is constant. In other words the voltage across the controlled source of potential and the condenser does not change during the charging cycle.

This desired variation in the charging voltage is obtained by successively integrating and differentiating the voltage developed across the condenser and inserting the differentiated voltage in series with the steady direct potential. In order that the differentiated wave not be of the same shape as the original wave it is necessary that the time constants of the differentiating and integrating circuits be different.

Figures 1, 2:
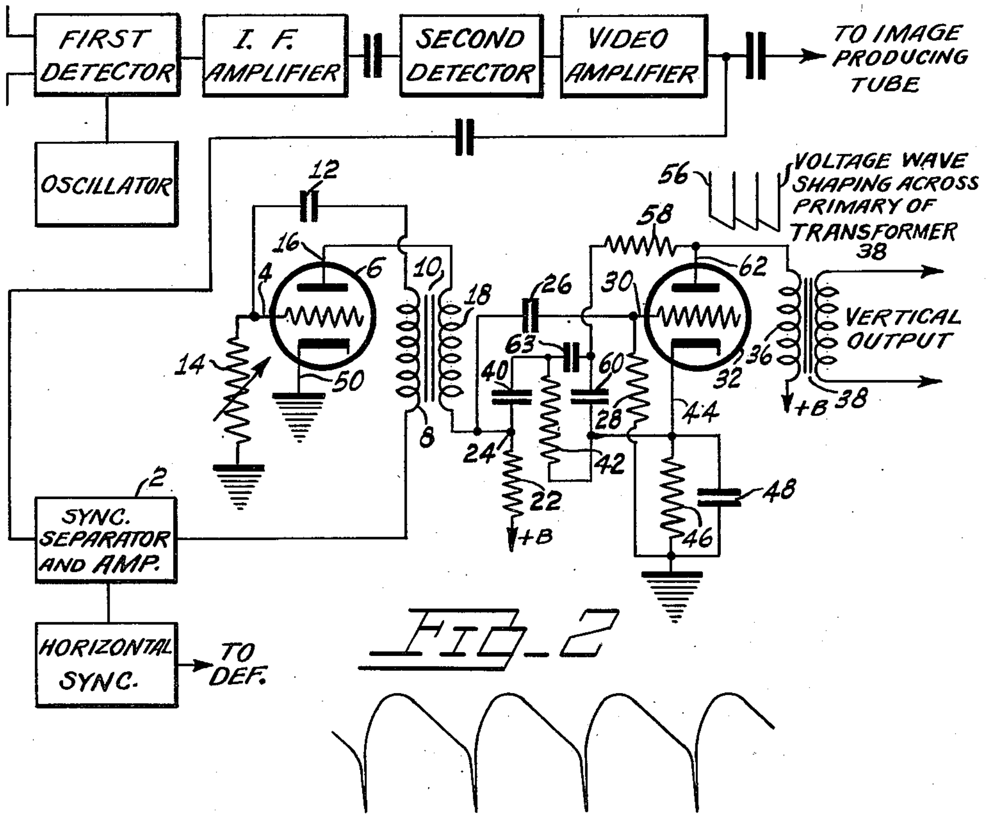
Figure 1 shows a sweep circuit embodying one form of this invention.
Figure 2 shows the waveform developed by the integrating circuit.

In Figure 1 there is shown a block diagram of a standard television receiver, wherein the output of sync separator 2 is fed to the grid 4 of the discharge tube 6 via the primary 8 of transformer 10, coupling condenser 12 and variable resistor 14, the latter being connected between the grid 4 and ground so that the duration of the sweep voltage wave can be adjusted. The plate 16 of discharge tube 6 is connected to B+ via the secondary 18 of transformer 10 and a load resistor 22, and the output appearing at the junction 24 of the resistor and the secondary 18 is coupled via condenser 26 and grid leak resistor 28 to the grid 30 of the sweep voltage output amplifier 32, the plate 62 being connected to B+ via the primary 36 of output transformer 38.

The charging condenser across which the desired voltage waveform is to be developed before being applied to grid 30 is indicated by numeral 40 and is connected between junction 24 and ground via a peaking resistor 42, the cathode 44 of amplifier 32 and the parallel resistance 46 and condenser 48. Inasmuch as the cathode 50 of the discharge tube 6 is grounded and its plate 16 is connected to junction 24, it rapidly discharges the condenser 40 when a pulse from sync separator 2 biases it into conduction.

Figure 3:
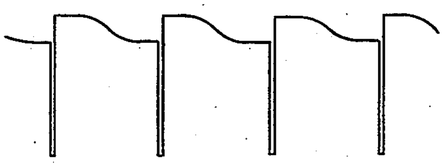
Figure 3 shows the waveform developed by the differentiating circuit.

Thus the circuit described is a standard sweep generator in which condenser 40 is charged and discharged so as to form a voltage wave similar to that indicated by numeral 56, provided the condenser is charged to a fraction of the B+ potential. By addition of the integrating circuit comprised of resistor 58 and condenser 60 between the plate 62 and cathode 44 an output such as shown in Figure 2 is developed across the condenser 60, and this is supplied to a differentiating circuit comprised of condenser 63 and peaking resistor 42 so as to produce a waveform such as shown in Figure 3 across the resistor 42. Because resistor 42 is connected between ground and one plate of condenser 40, the voltage of that plate varies with respect to ground as shown in Figure 3, and the charging voltage actually applied to the condenser is seen to be maintained substantially constant for as condenser 40 charges the voltage of the plate decreases. Therefore, in accordance with the theory explained above, a linear sweep voltage is generated having a maximum amplitude at a value approaching B+. It is to be noted that this desired result is obtained by the addition of only two condensers and a resistor to a standard circuit.

It is believed that the method of feeding back the voltage developed across a charging condenser via successive integrating and differentiating circuits of different time constants into series relationship with the charge path of the condenser is a new and novel way of producing linear sweep voltages with lower values of steady direct current potentials.

Having described my invention, I claim:

1. In a voltage generator circuit of the type in which the output voltage wave is developed by alternately charging and discharging a condenser, the charge path being through a desired amount of resistance, a circuit for changing the charge characteristics of said condenser in such manner that the charging voltage waveform across the condenser is linear comprising means for successively integrating and differentiating the voltage developed across said resistance, and means for introducing the differentiated voltage into series relationship with said condenser.

2. The method of charging a condenser through a resistance in such manner that the voltage variation across the condenser is linear comprising the steps of successively integrating and differentiating the voltage across said condenser and inserting the differentiated voltage in series with said condenser.

3. A sweep voltage generator comprising in combination a source of direct current voltage, a charge condenser and a resistor connected in series with said source of voltage, means for periodically discharging said condenser, polarity reversing means, said latter means having its input connected so as to receive the voltage developed across said resistor, an integrating circuit connected to the output of said polarity reverser, a differentiating circuit connected to the output of said integrating circuit, and the output of said differentiating circuit being connected in series with said charging condenser.

4. A sweep voltage generator such as described in claim 3 in which the polarity reversing means is an amplifier.

5. A sweep voltage generator comprising in combination a condenser, an impedance, connected in series with said condenser, a source of fixed potential connected in series with said condenser and said impedance, means for discharging said condenser, polarity reversing means having input and output terminals, the input being connected so as to receive a voltage proportional to the current passing through said condenser, an integrating circuit having input and output terminals, the input terminal of said integrating circuit being connected to the output terminal of said polarity reversing means, a differentiating circuit having input and output terminals, the input terminal of said differentiating circuit being connected to the output terminal of said integrating circuit, and means for applying the voltage appearing at the output terminal of said differentiating circuit in series with said impedance, condenser and source of fixed potential.

EDWIN L. CLARK.

REFERENCES CITED

The following references are of record in the file of this patent:

UNITED STATES PATENTS

| Number | Name | Date |
|---|---|---|
| 2,126,243 | Busse et al. | Aug. 9, 1938 |
| 2,383,333 | Milward | Aug. 21, 1945 |